No. 773,711. PATENTED NOV. 1, 1904.
E. A. CAMPBELL.
SAFETY PIN HOOK AND EYE.
APPLICATION FILED FEB. 8, 1904.
NO MODEL.
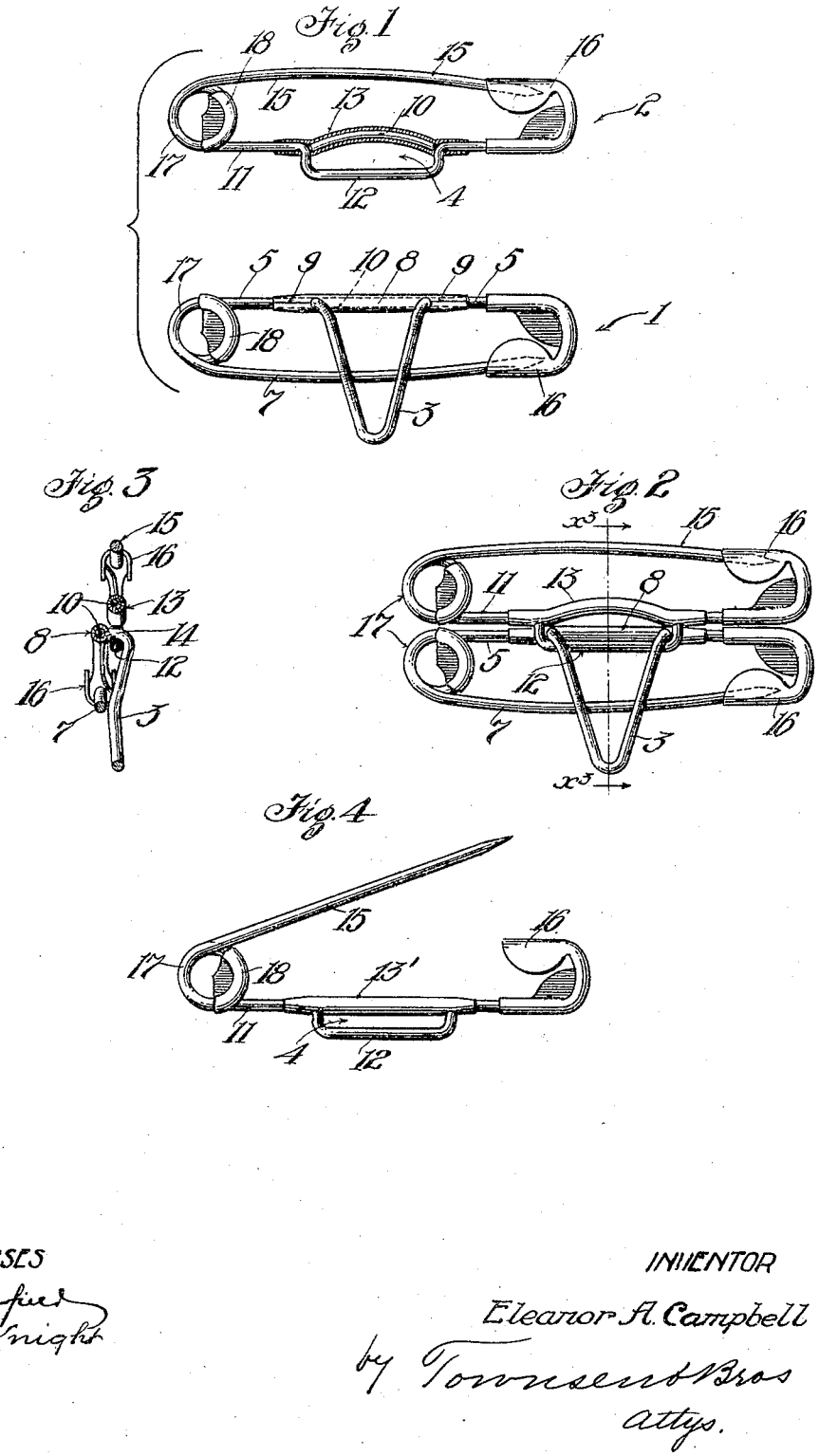
WITNESSES
INVENTOR
Eleanor A. Campbell
by Townsend Bros
attys.

No. 773,711. Patented November 1, 1904.

UNITED STATES PATENT OFFICE.

ELEANOR A. CAMPBELL, OF LOS ANGELES, CALIFORNIA.

SAFETY-PIN HOOK AND EYE.

SPECIFICATION forming part of Letters Patent No. 773,711, dated November 1, 1904.

Application filed February 8, 1904. Serial No. 192,502. (No model.)

*To all whom it may concern:*

Be it known that I, ELEANOR A. CAMPBELL, a citizen of the United States, residing at Los Angeles, in the county of Los Angeles and State of California, have invented certain Improvements in Safety-Pin Hooks and Eyes, of which the following is a specification.

This invention relates to improvements on the safety-pin hook and eye disclosed in my former patent, No. 751,610, dated February 9, 1904; and its principal object is to provide for holding the hook-and-eye fastener parts in close juxtaposition and to make the said parts stronger and stiffer.

The accompanying drawings illustrate the invention.

Figure 1 is a side view of a hook and eye embodying this invention, the parts being detached. Fig. 2 is a similar view showing the parts attached. Fig. 3 is a section on the line $x^3$ $x^3$ in Fig. 2. Fig. 4 is a side view of a modified form of the eye member.

The fastener comprises the hook part 1, having a hook 3, and an eye part 2, having an eye 4, each part having two wire members flexibly connected at one end and separably connected at the other end to form a safety-pin. One member, 5, of the part 1 has its central portion bent in V shape to form the hook or tongue 3, which extends across to and beyond the other member, 7, of part 1 and in such proximity to said member that the distance between them is less than the diameter of the eye-member portion 12, forming one side of the eye 4, so that normally said portion will not pass between the tongue 3 and said member 7, but will require force to be applied thereto, which will cause it to snap between the tongue and the member 7. (See Fig. 3.) I have found that when the member of said part is bent to form a hook in this manner the hook weakens the member 5, so that it is liable to bend under the pull to which it is subjected in use. To overcome this difficulty, I provide a bridge 8, extending between the two ends of the hook and bracing the same against strain, this bridge or brace being substantially in line with the unbent portion of member 5. Said bridge may consist of a tubular piece split at the ends, as at 9, and crimped over the wire member 5. One member, 11, of the part 2 has its central portion bent substantially in the plane of said part, but away from the straight member 15, to form a loop 12 thereon, forming one side of the elongated eye 4, whose other side is formed by a bridge 13, similar to the bridge 8 above described and also serving as a brace for the member 11. The bridge 13 is preferably bent or curved toward the other member, 15, of said part 2, as shown in Figs. 1, 2, and 3, or it may be straight, as shown at 13' in Fig. 4. A stiffening-wire 10 may be inserted in the central portion of the bridge, as shown in Figs. 1 and 3. The outer side 12 of the elongated eye 4 is so close to the member 11 that when the hook is drawn fully into the eye the members 11 and 5 will lie in close juxtaposition.

On referring to Fig. 3 it will be seen that the hook springs from the member 5 in a lateral direction, as shown at 14, and then bends again over toward the member 7, and this lateral part engages closely between the sides 12 13 of the eye to firmly hold the parts 1 2 of the fastener in alinement and close attachment. The other members, 7 15, of parts 1 2 are formed as substantially straight pins, engaging in the usual shields 16. 17 designates the springs for said pins, and 18 the guards for said springs.

The fastener parts above described are stronger than the usual safety-pin and are adapted when engaged and pulled upon by the pinned garments to lie close together and substantially in the same plane, thus presenting a neat appearance. Moreover, the eye engages with the hook in such a manner as to prevent endwise displacement of the hook part of the fastener on the eye part. The hook and eye being formed centrally on the respective members the parts are reversible and the hook may be inserted in the eye from either side, reversing the parts endwise without throwing their ends out of line. The eye being in the same plane as the two members of the part 2 it follows that when the parts are attached the whole device may lie flat on the garment.

What I claim is—

In a fastener, two parts, each comprising two members flexibly connected at one end and detachably connected at the other, one member of each part being straight and the other member being bent intermediate its ends, the bend of one of said members being in the plane of the part but away from the other member to form one side of an eye, and the bend of the bent member of the other part extending laterally out of the plane of said part and then toward and across the straight member of said part to form a hook, the distance between the hook and said straight member being less than the diameter of the bent portion of the other part, and a bridge across the bent portion of each of said bent members, each bridge being formed from a tubular piece of material, the ends of which are split and crimped around the respective member.

In testimony whereof I have signed my name to this specification, in the presence of two subscribing witnesses, at Los Angeles, in the county of Los Angeles and State of California, this 30th day of January, 1904.

ELEANOR A. CAMPBELL.

Witnesses:
 ARTHUR P. KNIGHT,
 JULIA TOWNSEND.